US011435972B2

(12) United States Patent
Chang et al.

(10) Patent No.: US 11,435,972 B2
(45) Date of Patent: Sep. 6, 2022

(54) IMMERSIVE MULTIMEDIA SYSTEM, IMMERSIVE INTERACTIVE METHOD AND MOVABLE INTERACTIVE UNIT

(71) Applicants: Yao-Lin Chang, Taipei (TW); Ching-Tai Chang, Taipei (TW); Chien-Chu Chen, Taipei (TW); Jui-Min Huang, Taipei (TW); Cheng-Ya Chi, Taipei (TW); Ken-Ping Lin, Taipei (TW); Han-Hsuan Tsai, Taipei (TW); Chih-Wen Chiang, Taipei (TW)

(72) Inventors: Yao-Lin Chang, Taipei (TW); Ching-Tai Chang, Taipei (TW); Chien-Chu Chen, Taipei (TW); Jui-Min Huang, Taipei (TW); Cheng-Ya Chi, Taipei (TW); Ken-Ping Lin, Taipei (TW); Han-Hsuan Tsai, Taipei (TW); Chih-Wen Chiang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 17/035,769

(22) Filed: Sep. 29, 2020

(65) Prior Publication Data

US 2021/0103421 A1 Apr. 8, 2021

Related U.S. Application Data

(60) Provisional application No. 62/912,600, filed on Oct. 8, 2019.

(51) Int. Cl.
*G06F 3/14* (2006.01)
*G06F 3/041* (2006.01)
(Continued)

(52) U.S. Cl.
CPC ............ *G06F 3/1446* (2013.01); *G06F 3/011* (2013.01); *G06F 3/0412* (2013.01); *G06F 3/0421* (2013.01)

(58) Field of Classification Search
CPC ...... G06F 3/011; G06F 3/0412; G06F 3/0421; G06F 3/1446; G06F 3/147; G09G 2354/00; G09G 2370/16; G09G 2300/026
See application file for complete search history.

(56) References Cited

U.S. PATENT DOCUMENTS

| 2010/0103330 A1* | 4/2010 | Morrison | G06F 3/0412 |
| | | | 348/744 |
| 2010/0236445 A1* | 9/2010 | King | E01B 25/34 |
| | | | 104/130.03 |

(Continued)

*Primary Examiner* — Robin J Mishler
(74) *Attorney, Agent, or Firm* — JCIPRNET

(57) ABSTRACT

An immersive multimedia system, an immersive interactive method and a movable interactive unit are provided in the disclosure. The immersive multimedia system includes multiple movable interactive units, an imaging apparatus, and a computer device. The multiple movable interactive units are disposed on at least one of the wall and the ground. The imaging apparatus is adapted to display an image screen on at least one of the wall and the ground. The computer device is connected to the multiple movable interactive units and the imaging apparatus. The computer device is adapted to control the multiple movable interactive units and the imaging apparatus. The multiple movable interactive units each include a touch sensing unit, and the image screen provided by the imaging apparatus changes in response to the touch sensing unit of at least one of the multiple movable interactive units sensing being touched.

27 Claims, 19 Drawing Sheets

(51) Int. Cl.
*G06F 3/042* (2006.01)
*G06F 3/01* (2006.01)

(56) References Cited

U.S. PATENT DOCUMENTS

2014/0370608 A1* 12/2014 Gelbman ........... G01N 35/0095
436/47
2017/0060319 A1* 3/2017 Seo ..................... G06F 3/011

* cited by examiner

IMMERSIVE MULTIMEDIA SYSTEM, IMMERSIVE INTERACTIVE METHOD AND MOVABLE INTERACTIVE UNIT

CROSS-REFERENCE TO RELATED APPLICATION

This application claims the priority benefit of U.S. provisional application Ser. No. 62/912,600, filed on Oct. 8, 2019. The entirety of the above-mentioned patent application is hereby incorporated by reference herein and made a part of this specification.

BACKGROUND

Technical Field

The disclosure relates to a multimedia system, and particularly to an immersive multimedia system, an immersive interactive method, and a movable interactive unit.

Description of Related Art

Some current products for training coordination, reaction or senses may adopt electronic products such as mobile phones or tablets to perform operations of virtual touch or motion simulation to train the attention, reaction, physical coordination, and sensory identification and cognition, knowledge application, physical fitness, or the like of children and young people. Moreover, other reaction training products may adopt virtual reality (VR), augmented reality (AR), or wearable electronic products for motion simulation. However, most of the training products require users to hold or wear related equipment and sensors to perform their training operations, which limits the range of physical activities or training. Therefore, for the users, this may cause inconvenience in training and result in poor results.

SUMMARY

In view of this, the disclosure provides an immersive multimedia system, an immersive interactive method, and a movable interactive unit capable of providing an immersive interactive context having a good user experience, so that the coordination, reaction, or senses of the user are effectively trained through the immersive interactive context.

The immersive multimedia system in the disclosure is adapted to provide an immersive multimedia context in a space. The space includes a wall and a ground. The immersive multimedia system includes a plurality of movable interactive units, an imaging apparatus, and a computer device. The plurality of the movable interactive units are disposed on at least one of the wall and the ground. The imaging apparatus is adapted to display an image screen on at least one of the wall and the ground. The computer device is connected to the plurality of the movable interactive units and the imaging apparatus and adapted to control the plurality of the movable interactive units and the imaging apparatus. The plurality of the movable interactive units each include a touch sensing unit, and the image screen provided by the imaging apparatus changes in response to the touch sensing unit of at least one of the plurality of the movable interactive units sensing being touched.

The immersive interactive method in the disclosure is adapted to be applied to the immersive multimedia system. The immersive multimedia system is adapted to provide immersive multimedia information in the space. The space includes a wall and a ground. The immersive multimedia system includes a plurality of movable interactive units, an imaging apparatus, and a computer device. The plurality of the movable interactive units are disposed on at least one of the wall and the ground. The immersive interactive method includes the following steps. An image screen is displayed on at least one of the wall and the ground through the imaging apparatus. Moreover, the image screen provided by the imaging apparatus is changed in response to the touch sensing unit of at least one of the plurality of the movable interactive units sensing being touched.

The movable interactive unit in the disclosure is adapted to be disposed on at least one of the wall and the ground of the space and is connected to a computer device. A track mechanism is disposed on at least one of the wall and the ground. The computer device controls the movable interactive unit. The movable interactive unit includes a casing, a touch sensing unit, a magnet, and a light-emitting unit. The casing includes a light transmitting plate. The touch sensing unit is disposed in the casing and under the light transmitting plate. The magnet is disposed in the casing and adapted to be combined with an electromagnet of a carrier disposed on a track of the track mechanism. The light-emitting unit is disposed in the casing and under the light transmitting plate. The movable interactive unit moves along the track with the carrier.

Based on the above, the immersive multimedia system, the immersive interactive method, and the movable interactive unit in the disclosure are capable of providing users an immersive interactive experience without wearing any equipment or sensors and also allowing one or more users to participate in the immersive interactive experience provided by the multimedia system at the same time.

In order to make the aforementioned features and advantages of the disclosure comprehensible, embodiments accompanied with drawings are described in detail below.

DESCRIPTION OF THE EMBODIMENTS

Figure 1:
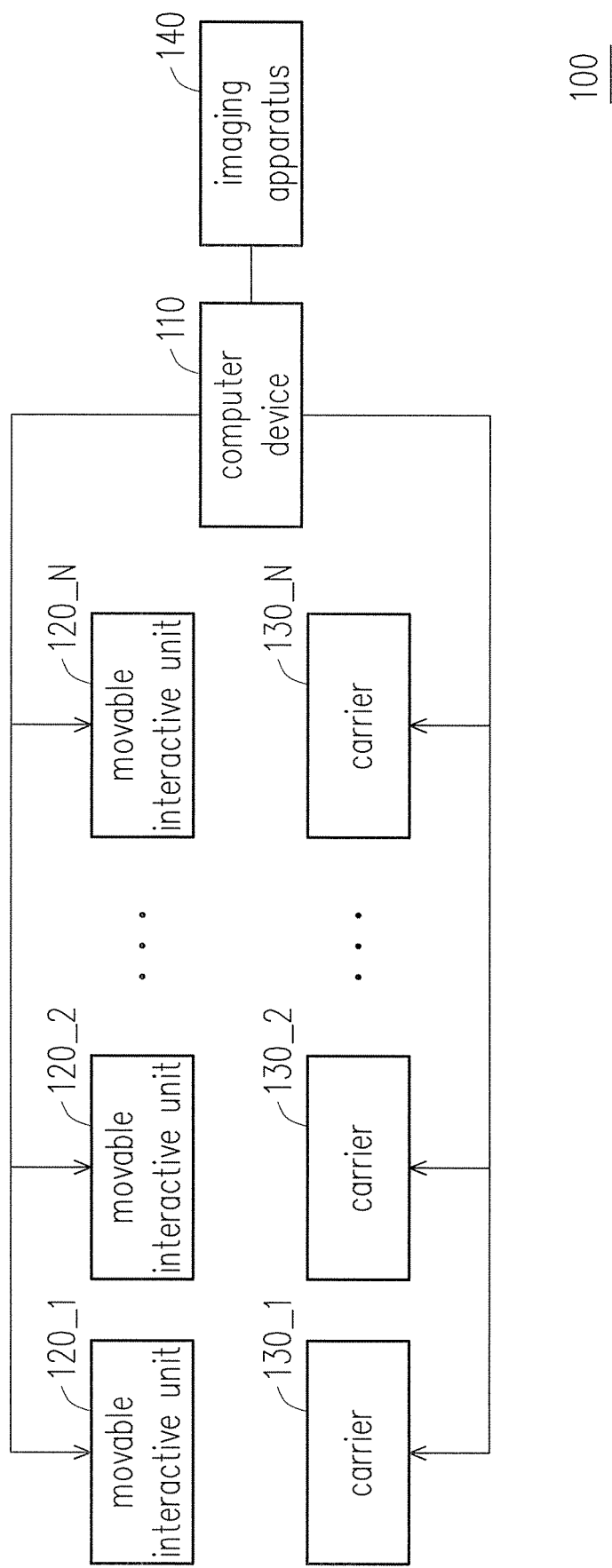
FIG. 1 is a circuit block view of an immersive multimedia system according to an embodiment of the disclosure.

In order to make the content of the disclosure easier to understand, the following specific embodiments are illustrated as examples of the actual implementation of the disclosure. Moreover, wherever possible, elements/components/steps with the same reference numerals in the drawings and embodiments represent the same or similar parts.

Figure 2A:
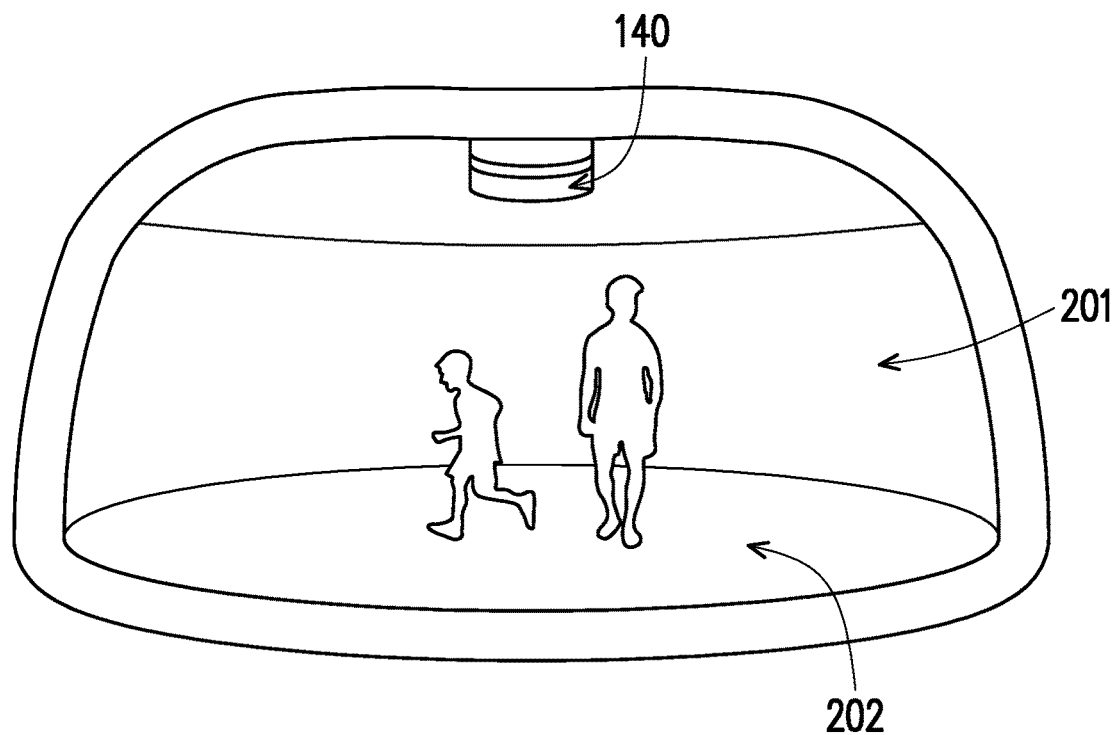
FIG. 2A is a schematic view of the space of an immersive multimedia system according to an embodiment of the disclosure.
Figure 2B:
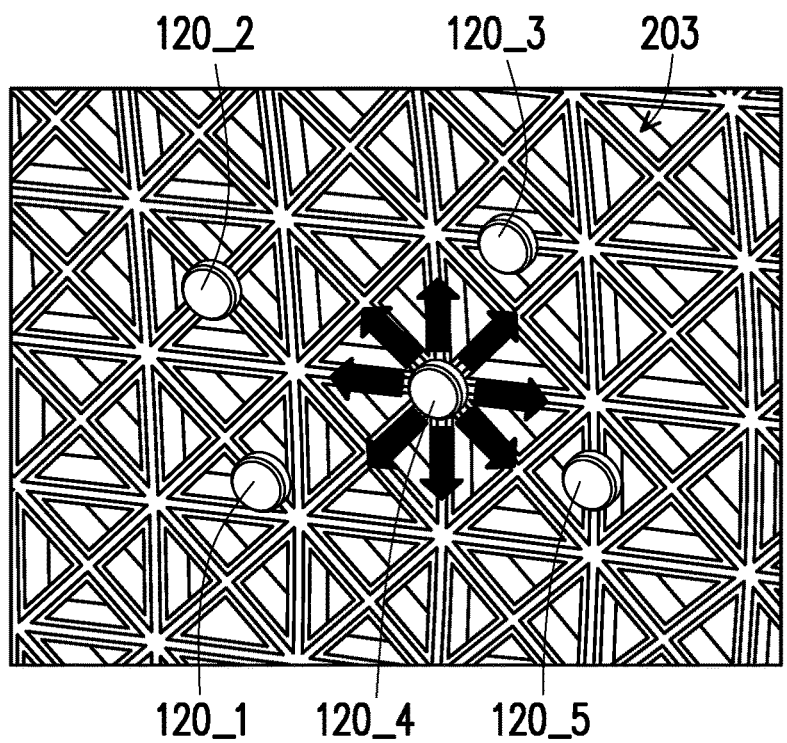
FIG. 2B is a schematic view of the arrangement of a movable interactive unit and a track according to an embodiment of the disclosure.

FIG. 1 is a circuit block view of an immersive multimedia system according to an embodiment of the disclosure. FIG. 2A is a schematic view of the space of an immersive multimedia system according to an embodiment of the disclosure. FIG. 2B is a schematic view of the arrangement of a movable interactive unit and a track according to an embodiment of the disclosure. Referring to FIG. 1 to FIG. 2B, an immersive multimedia system 100 includes a computer device 110, movable interactive units 120_1-120_N, carriers 130_1-130_N, and an imaging apparatus 140. The N is a positive integer. The computer device 110 may be, for example, a computer host, a server host, or a similar host electronic device; and the computer device 110 is connected (electrically connected) to the movable interactive units 120_1-120_N, the carriers 130_1-1301\1, and the imaging apparatus 140 to control the movable interactive units 120_1-120_N, the carriers 130_1-130_N, and the imaging apparatus 140. The computer device 110 is connected to the movable interactive units 120_1-120_N, the carriers 130_1-130_N, and the imaging apparatus 140 in a wired (e.g., a cable) mode or in a wireless (e.g. a Bluetooth) mode. However, the disclosure does not limit its connection and communication methods.

In the embodiment, the immersive multimedia system 100 is adapted to provide an immersive multimedia context (as shown in FIG. 2A) in a closed or semi-closed space. The space includes a wall 201 and a ground 202. A track mechanism 203 (as shown in FIG. 2B) is disposed on at least one of the wall 201 and the ground 202. In the embodiment, an electric integrated power system is disposed inside the wall 201 and the ground 202 to drive the movable interactive units 120_1-120_N to move on the wall 201 and the ground 202. For example, as shown in FIG. 2B, the movable interactive units 120_1-120_5 are combined with corresponding carriers and move randomly along the track mechanism 203 on at least one of the wall 201 and the ground 202 according to the control commands of the computer device 110.

In the embodiment, the imaging apparatus 140 may be, for example, a projector disposed in the space to project an interactive image on at least one of the wall 201 and the ground 202. Alternatively, in an embodiment, the imaging apparatus 140 may be, for example, a display screen or a display panel disposed on at least one of the wall 201 and the ground 202 in the space, so that the interactive image is displayed on at least one of the wall 201 and the ground 202. Note that in the embodiment, the movable interactive units 120_1-120_N each include a touch sensing unit, and the image screen provided by the imaging apparatus 140 is changed in response to the touch sensing unit of at least one of the movable interactive units 120_1-120_N sensing being touched. In other words, with the immersive multimedia system 100 in the embodiment, the space presents an immersive context through the imaging apparatus 140 and guides the user to interact with the movable interactive units 120_1-120_N through designed video contents. Moreover, a speaker may be disposed in the space to match the image screen provided by the imaging apparatus 140 to provide corresponding sound effects.

Figure 3:
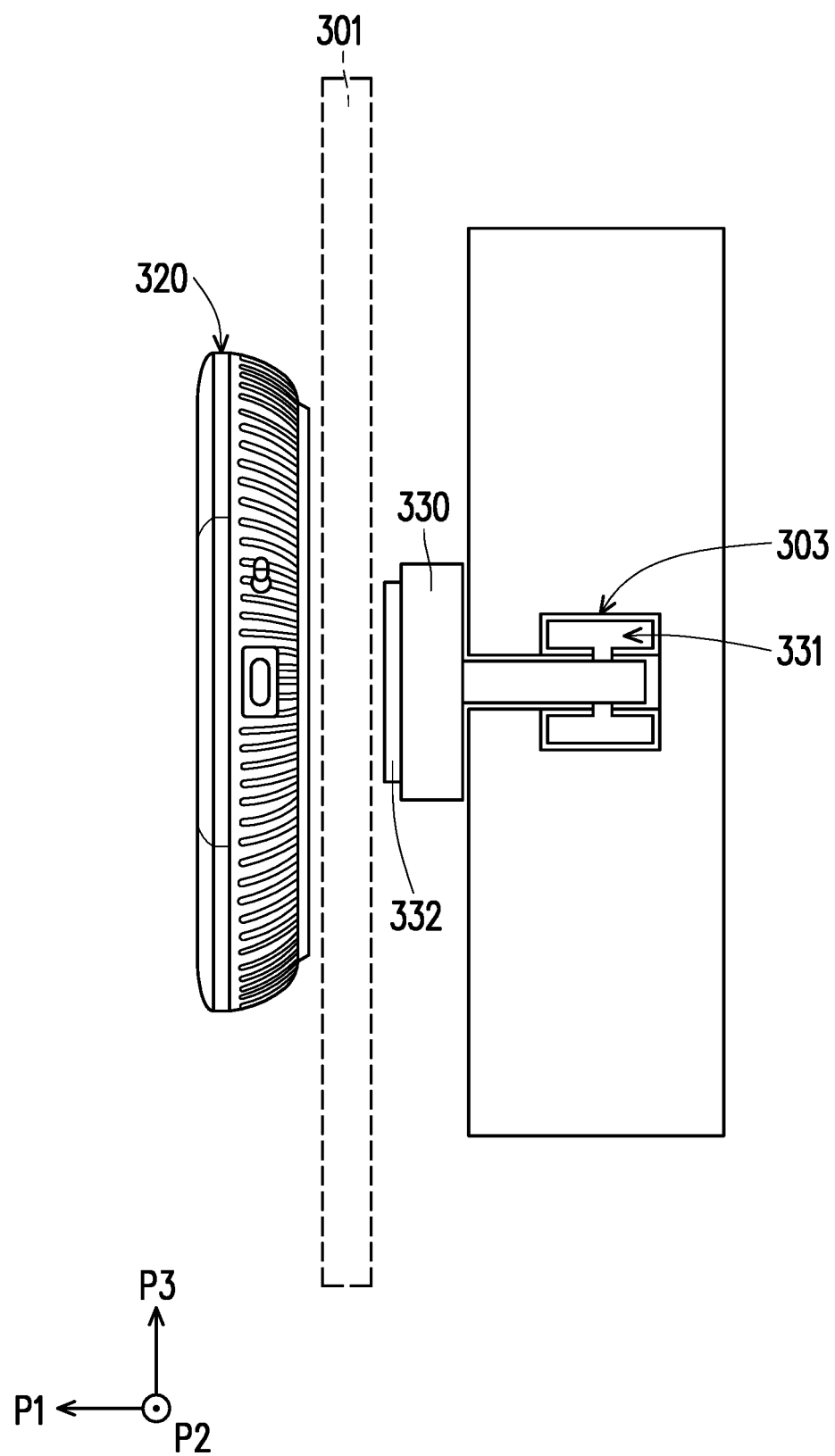
FIG. 3 is a schematic view of the arrangement of a movable interactive unit and a wall according to an embodiment of the disclosure.

FIG. 3 is a schematic view of the arrangement of a movable interactive unit and a wall according to an embodiment of the disclosure. Referring to FIG. 3, any one of the movable interactive units 120_1-120_N and the carriers 130_1-130_N in FIG. 1 may be a movable interactive unit 320 and a carrier 330 as shown in FIG. 3. In the embodiment, the carrier 330 each includes a carrier axle 331 and an electromagnet 332. The carrier 330 is embedded in the carrier track 303 through the carrier axle, and the carrier 330 is combined with the corresponding movable interactive unit 320 through the electromagnet 332, so that the carrier 330 and the movable interactive unit 320 move together along the track 303. In the embodiment, a magnet is also disposed on the back of the movable interactive unit 320 to combine with the electromagnet 332 of the carrier 330 through magnetic force. Moreover, the movable interactive unit 320 and the carrier 330 may be apart from each other by the wall 301 or the ground (a wall or a ground made of materials that produce a smooth surface), or the display screen or display panel as described above.

Figure 4:
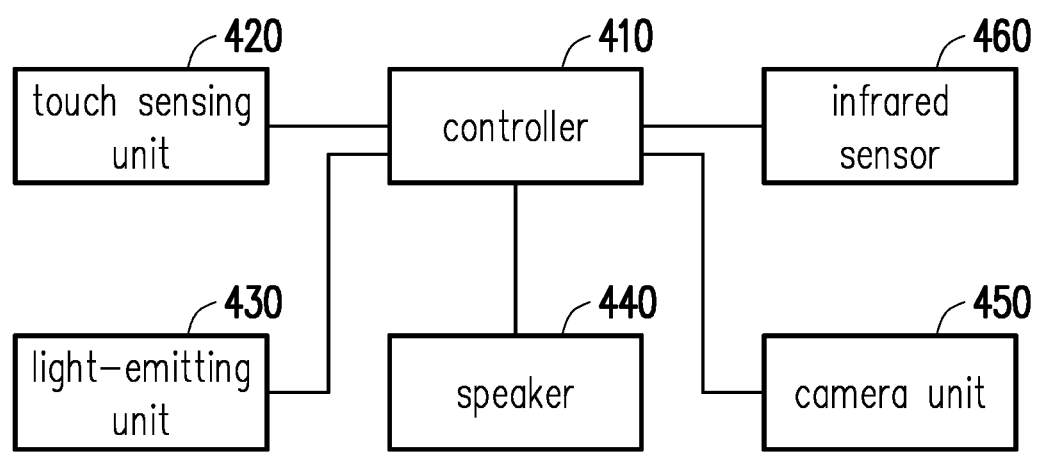
FIG. 4 is a circuit block view of a movable interactive unit according to an embodiment of the disclosure.

FIG. 4 is a circuit block view of a movable interactive unit according to an embodiment of the disclosure. Referring to FIG. 4, the internal circuits and functional units of each of the movable interactive units 120_1-120_N in FIG. 1 may be a movable interactive unit 400 in FIG. 4. In the embodiment, the movable interactive unit 400 includes a controller 410, a touch sensing unit 420, a light-emitting unit 430, a speaker 440, a camera unit 450, and an infrared sensor 460. The controller 410 is connected (electrically connected) to the touch sensing unit 420, the light-emitting unit 430, the speaker 440, the camera unit 450, and the infrared sensor 460 to control the touch sensing unit 420, the light-emitting unit 430, the speaker 440, the camera unit 450, and the infrared sensor 460 to implement the following operations and actions of the movable interactive unit in each embodiment of the disclosure.

Figure 5A:
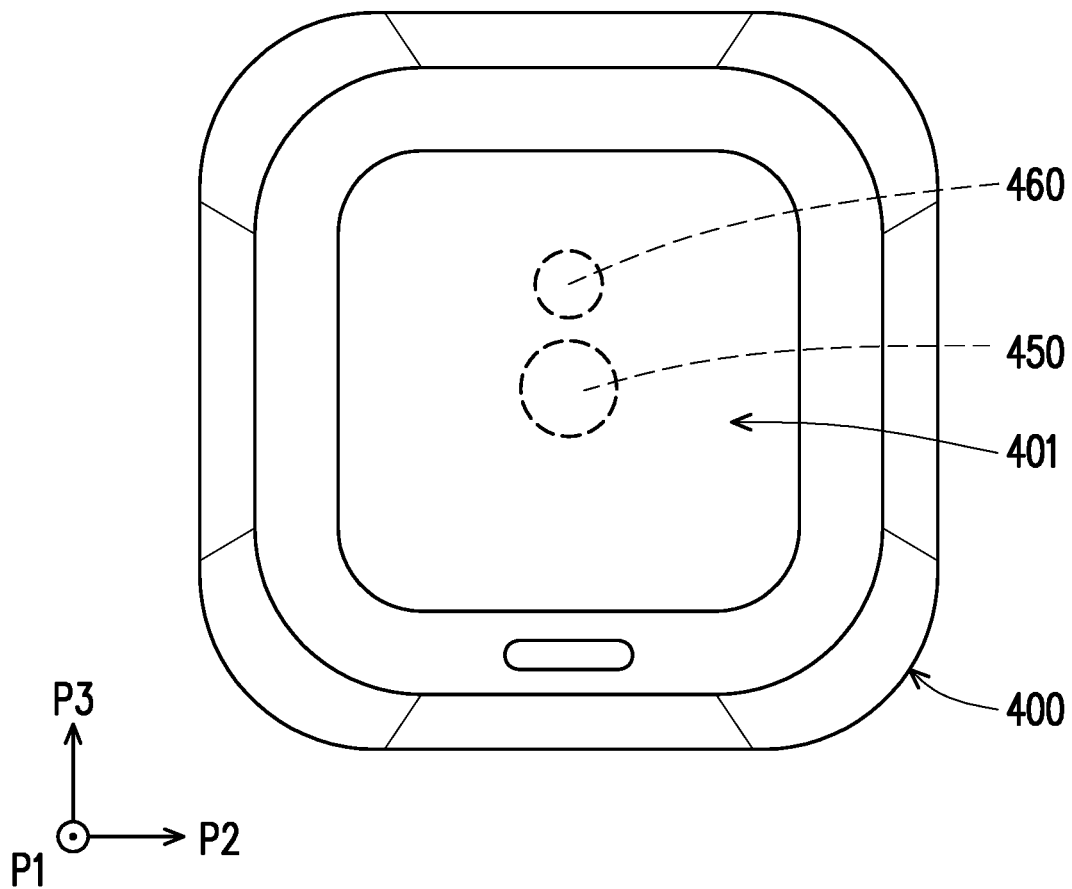
FIG. 5A is a schematic view of the front of a movable interactive unit according to an embodiment of the disclosure.
Figure 5B:
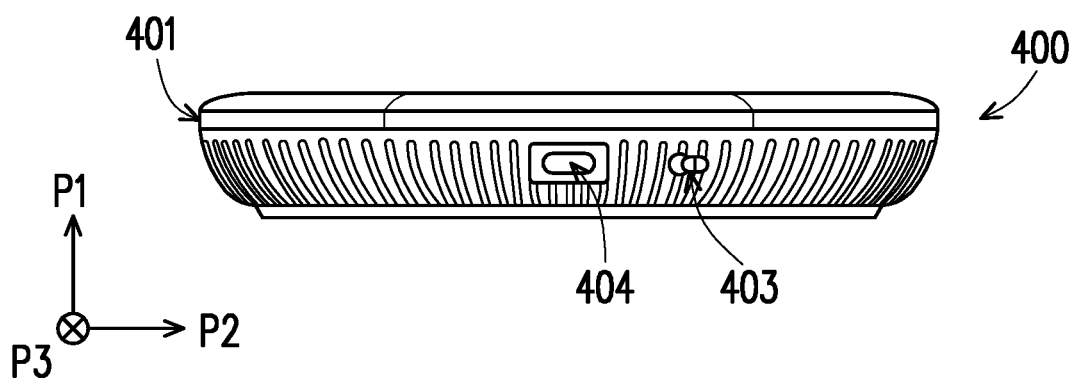
FIG. 5B is a schematic view of one side of a movable interactive unit according to an embodiment of the disclosure.
Figure 5C:
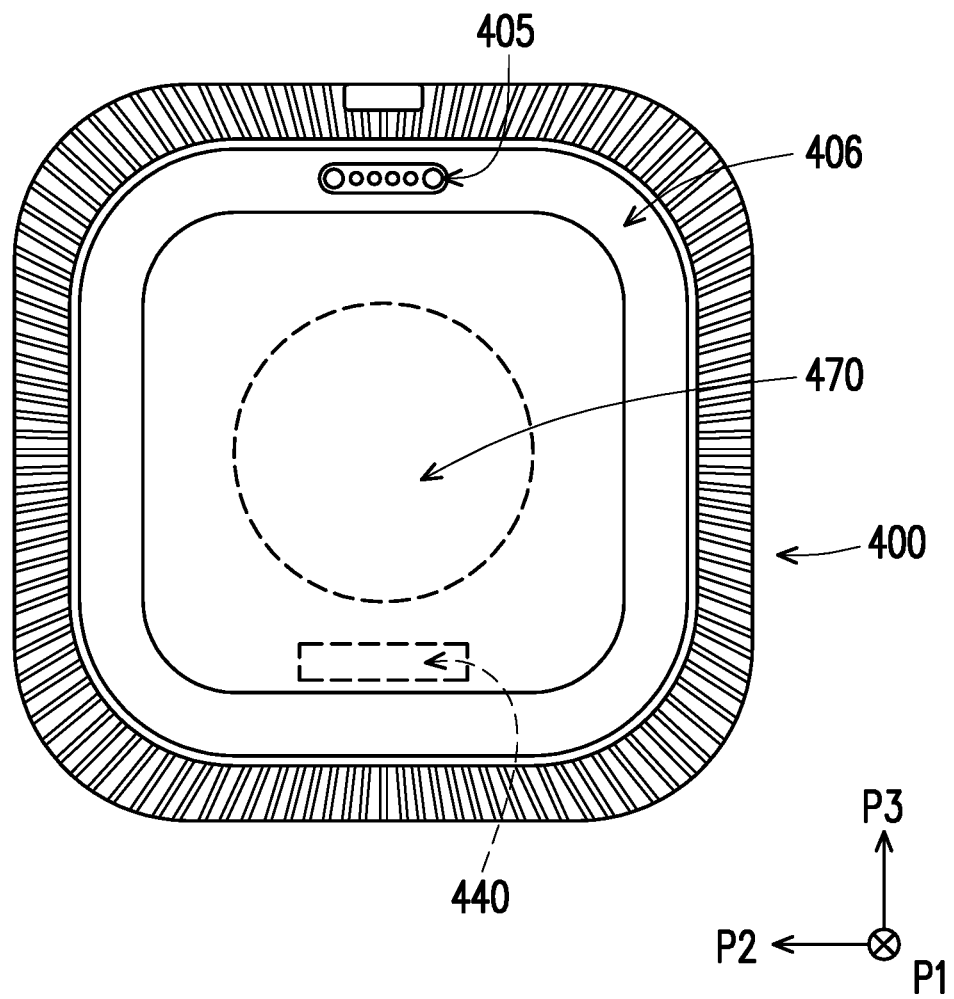
FIG. 5C is a schematic view of the back of a movable interactive unit according to an embodiment of the disclosure.

FIG. 5A is a schematic view of the front of a movable interactive unit according to an embodiment of the disclosure. FIG. 5B is a schematic view of one side of a movable interactive unit according to an embodiment of the disclosure. FIG. 5C is a schematic view of the back of a movable interactive unit according to an embodiment of the disclosure. FIG. 5A to FIG. 5C are examples of the appearance design of the movable interactive unit 400. Referring to FIG. 4 and FIG. 5A, the front of the movable interactive unit 400 is a plane facing the direction P1 and formed by extending and parallel to the directions P2 and P3; and the directions P1, P2, and P3 are perpendicular to one another. A light transmitting plate 401 is included on the front of the movable interactive unit 400, and the camera unit 450 and the infrared sensor 460 are disposed under the light transmitting panel 401. The movable interactive unit 400 also includes the touch sensing unit 420 and the light-emitting unit 430 or a light-emitting array formed by a plurality of the light-emitting units 430.

Referring to FIG. 4 and FIG. 5B, a switch 403 and a USB charging interface 404 are included on one side of the movable interactive unit 400. Referring to FIG. 4 and FIG. 5C, the speaker 440 and a magnet 470 are included on the back of the movable interactive unit 400, and a magnetic telescopic pin 405 and a rubber foot pad 406 are further disposed on the back of the movable interactive unit 400. Therefore, the movable interactive unit 400 is capable of using the aforementioned functional units to provide the function of detecting the action information of the user and guide the user to interact with the movable interactive unit 400 to enhance sensory recognition and cognitive ability.

Figure 6:
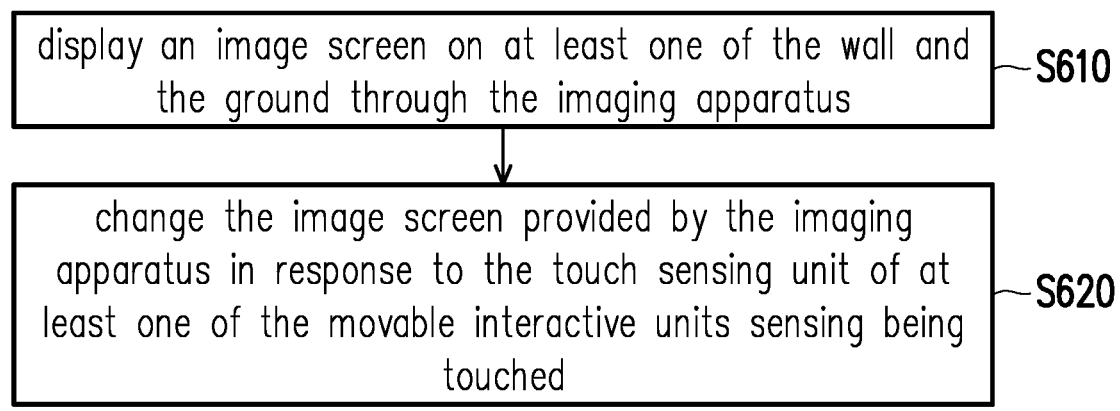
FIG. 6 is a flowchart illustrating an immersive interactive method according to an embodiment of the disclosure.

FIG. 6 is a flowchart illustrating an immersive interactive method according to an embodiment of the disclosure. Referring to FIG. 1 and FIG. 6, the immersive multimedia system 100 performs the immersive interactive method of the embodiment. In step S610, the immersive multimedia system 100 displays an image screen on at least one of the wall and the ground through the imaging apparatus 140. In step S620, the immersive multimedia system 100 changes the image screen provided by the imaging apparatus 140 in response to the touch sensing unit of at least one of the plurality of the movable interactive units 120_1-120_N sensing being touched. Therefore, the immersive multimedia system 100 in the embodiment provides an immersive interactive context through the movable interactive units 120_1-120_N and the imaging apparatus 140. Three exemplary embodiments are further presented to illustrate the operating modes provided by the immersive multimedia system 100 of the disclosure.

Figure 7:
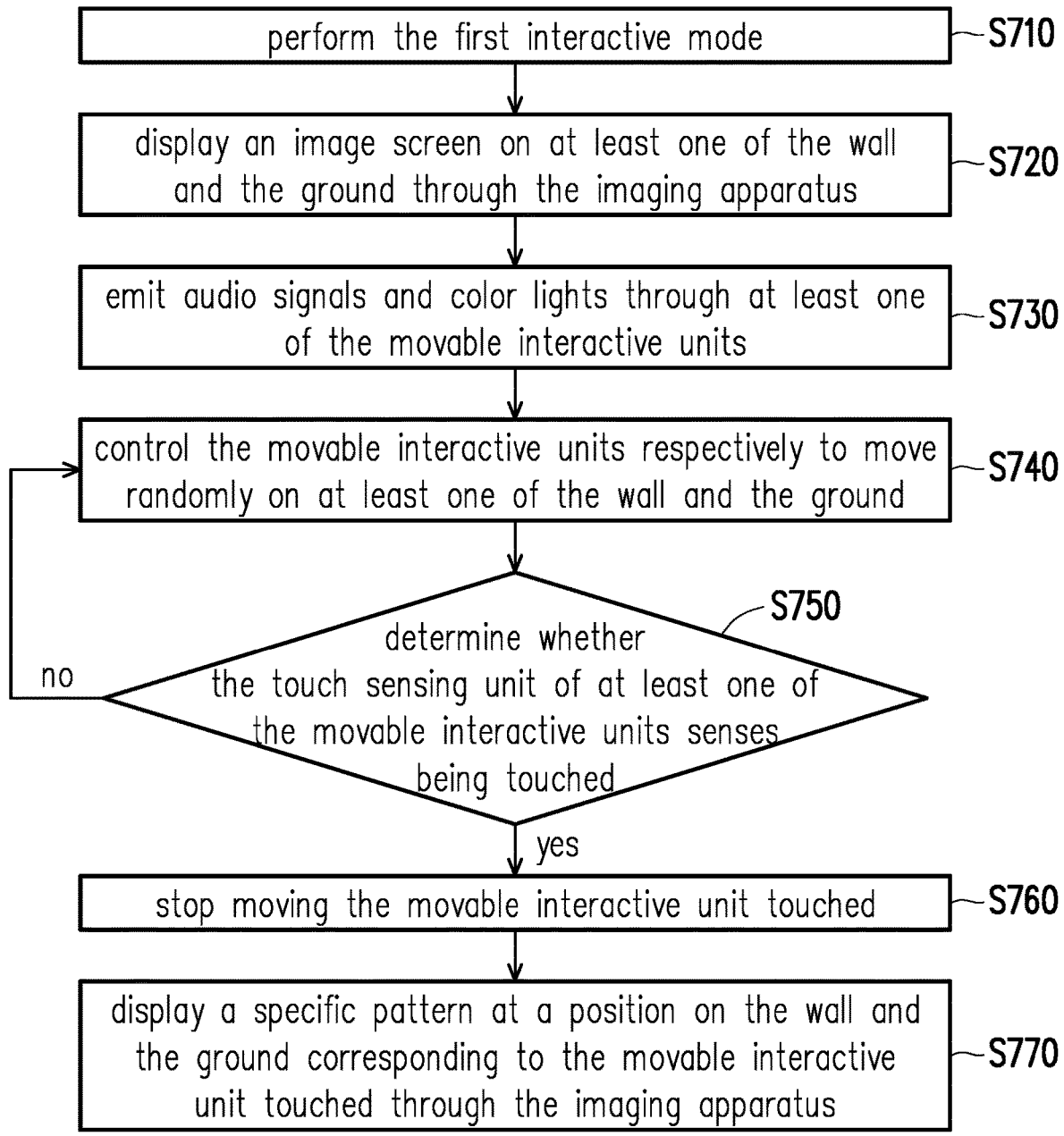
FIG. 7 is a flowchart illustrating an immersive interactive method according to the first embodiment of the disclosure.
Figure 8A:
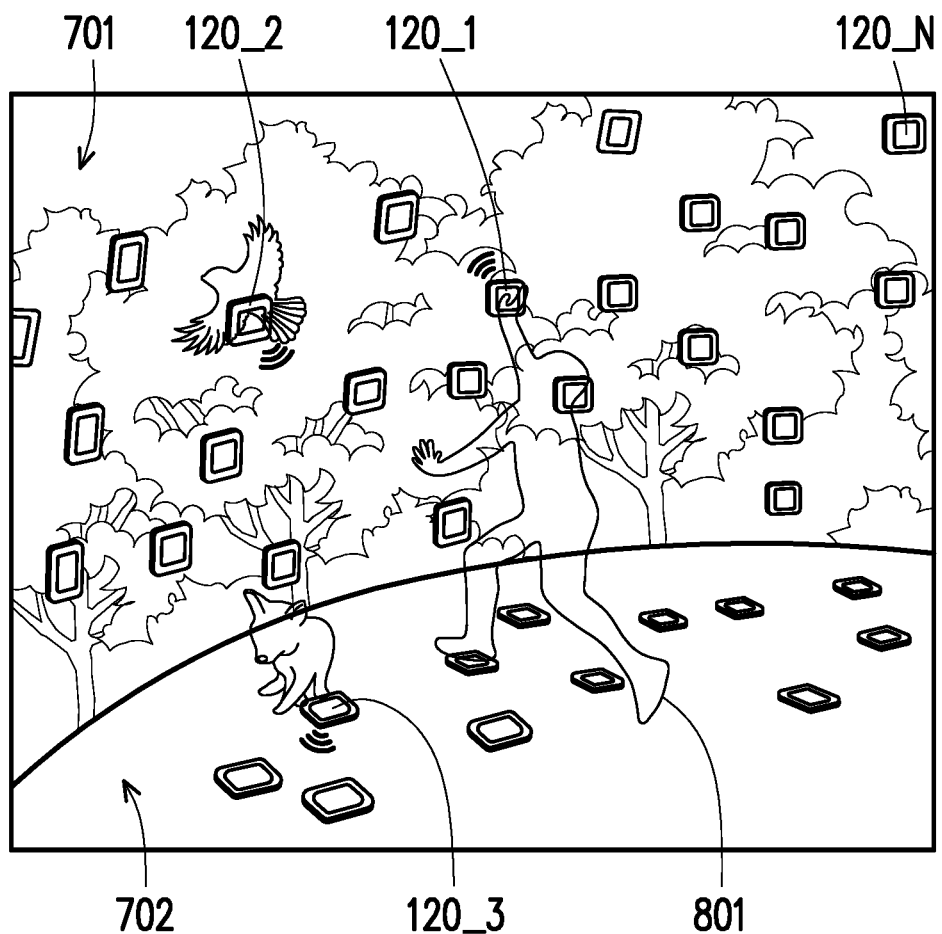
FIG. 8A is a schematic view of an immersive interactive context according to the first embodiment of the disclosure.
Figure 8B:
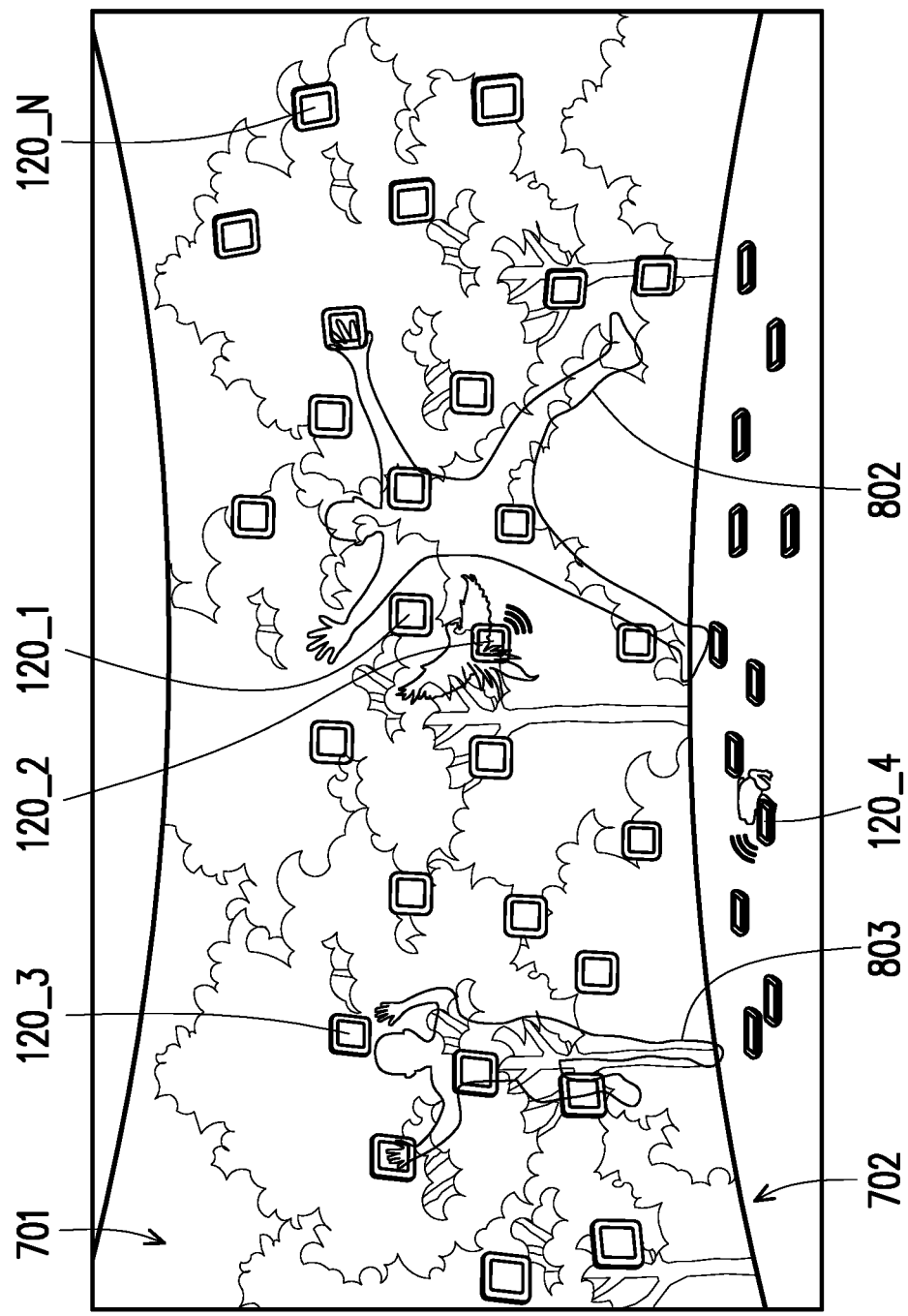
FIG. 8B is a schematic view of another immersive interactive context according to the first embodiment of the disclosure.

FIG. 7 is a flowchart illustrating an immersive interactive method according to the first embodiment of the disclosure. FIG. 8A is a schematic view of an immersive interactive context according to the first embodiment of the disclosure. FIG. 8B is a schematic view of another immersive interactive context according to the first embodiment of the disclosure. Referring to FIG. 1, FIG. 7, and FIG. 8A, in step S710, the immersive multimedia system 100 performs the first interactive mode. In step S720, in the first interactive mode, the imaging apparatus 140 displays an image screen on at least one of the wall 701 and the ground 702, such as a forest background image displayed on the wall 701 and the ground 702 in FIG. 8A. In step S730, the computer device 110 controls at least one of the movable interactive units 120_1-120_N to emit audio signals and color lights. The light-emitting units of the movable interactive units 120_1-120_N respectively emit color lights. The speakers of the movable interactive units 120_1-120_N respectively emit audio signals. In step S740, the computer device 110 controls at least part of the movable interactive units 120_1-120_N respectively to move randomly on at least one of the wall 701 and the ground 702.

In step S750, the computer device 110 determines whether the touch sensing unit of at least one of the plurality of the movable interactive units 120_1-120_N senses being touched. For example, when the movable interactive unit 120_1 emits a bug sound through a speaker, according to the bug sound and the image of the bug sound, the user 801, for example, searches for the movable interactive unit 120_1 to touch the movable interactive unit 120_1. In step S760, when the touch sensing unit of the movable interactive unit 120_1 senses being touched, the computer device 110 stops moving the movable interactive unit 120_1 touched. In step S770, the computer device 110 displays a specific pattern at a position on the wall 701 and the ground 702 corresponding to the movable interactive units 120_1-120_3 touched through the imaging apparatus 140. In this regard, specific patterns are icons such as insects, birds, puppies, or other animal icons. When the user 801 successfully touches the movable interactive units 120_1-120_3, the icons are displayed on the movable interactive units 120_1-120_3.

Referring to FIG. 1 and FIG. 8B, the first interactive mode also provides an effect of multiplayer interactive games. As shown in FIG. 8B, according to steps S710 to S770 in FIG. 7, the computer device 110 controls at least one of the movable interactive units 120_2-120_N to emit audio signals and color lights. For example, the users 802 and 803 may compete to search for the movable interactive units 120_2-120_4 according to images and sounds, such as insect calls, bird calls, or frog calls to touch the movable interactive units 120_2-120_4. Moreover, when the touch sensing units of the movable interactive units 120_2-120_4 sense being touched, the computer device 110 stops moving the movable interactive units 120_2-120_4 touched. The computer device 110 displays specific patterns at positions on the wall 701 and the ground 702 corresponding to the movable interactive units 120_1-120_3 touched through the imaging apparatus 140. In this regard, specific patterns are icons such as insects, birds, frogs, or other animal icons. Therefore, the first interactive mode in the embodiment is capable of providing one or more people with interactive training or games and thereby offering a good user immersive interactive experience.

Figure 8C:
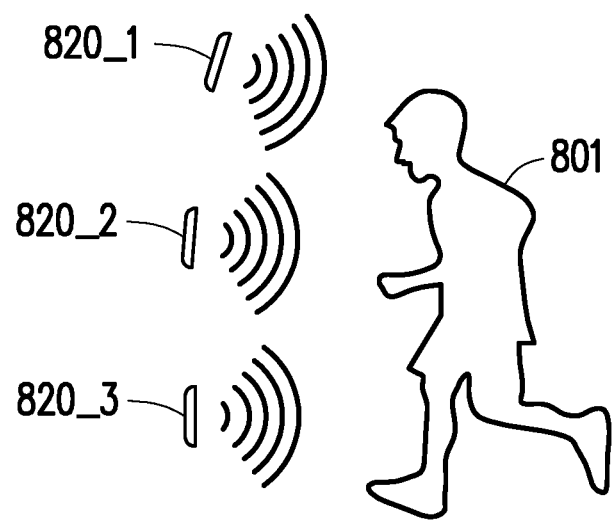
FIG. 8C is a schematic view of the height sensing of a movable interactive unit according to the first embodiment of the disclosure.
Figure 8D:
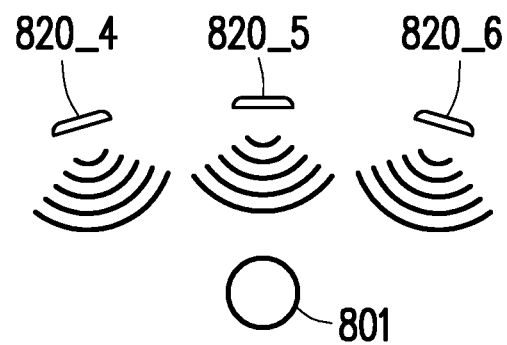
FIG. 8D is a schematic view of the position sensing of a movable interactive unit according to the first embodiment of the disclosure.

FIG. 8C is a schematic view of the height sensing of a movable interactive unit according to the first embodiment of the disclosure. FIG. 8D is a schematic view of the position sensing of a movable interactive unit according to the first embodiment of the disclosure. Referring to FIG. 8C, the movable interactive units 820_1-820_3 perform sensing, for example, through an infrared sensor and provide the sensing information to the computer device, so that the computer device adjusts the height distribution of the movable interactive units 820_1-820_3 according to the calculated height of the user 801. For example, the computer device adjusts the maximum height of the vertical range of the movements of the movable interactive units 820_1-820_3 according to the maximum height the user 801 touches. Referring to FIG. 8D the movable interactive units 820_4 to 820_5 perform sensing, for example, through an infrared sensor and provide sensing information to the computer device 110, so that the computer device 110 adjusts the horizontal distribution of the movable interactive units 820_1-820_3 according to the calculated range of the movement of the user 801. For example, the computer device adjusts the horizontal range of the movement of the movable interactive units 820_1-820_3 to be close to the user 801 so that the user 801 may approach to touch them. Therefore, each of the movable interactive units in the modes in FIG. 8A and FIG. 8B is capable of performing the sensing operation as shown in FIG. 8C and FIG. 8D to provide better interaction.

Figure 9:
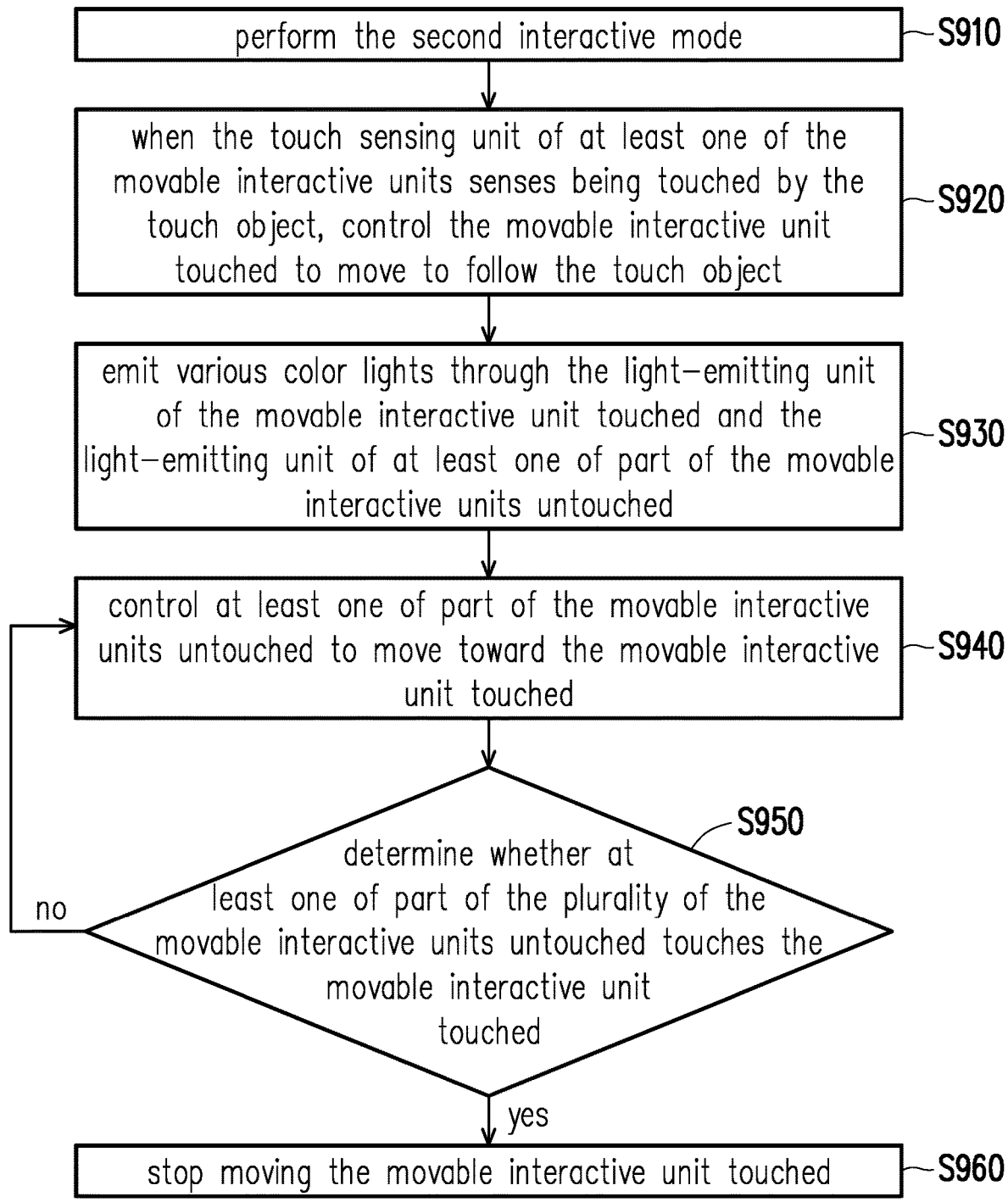
FIG. 9 is a flowchart illustrating an immersive interactive method according to the second embodiment of the disclosure.
Figure 10A:
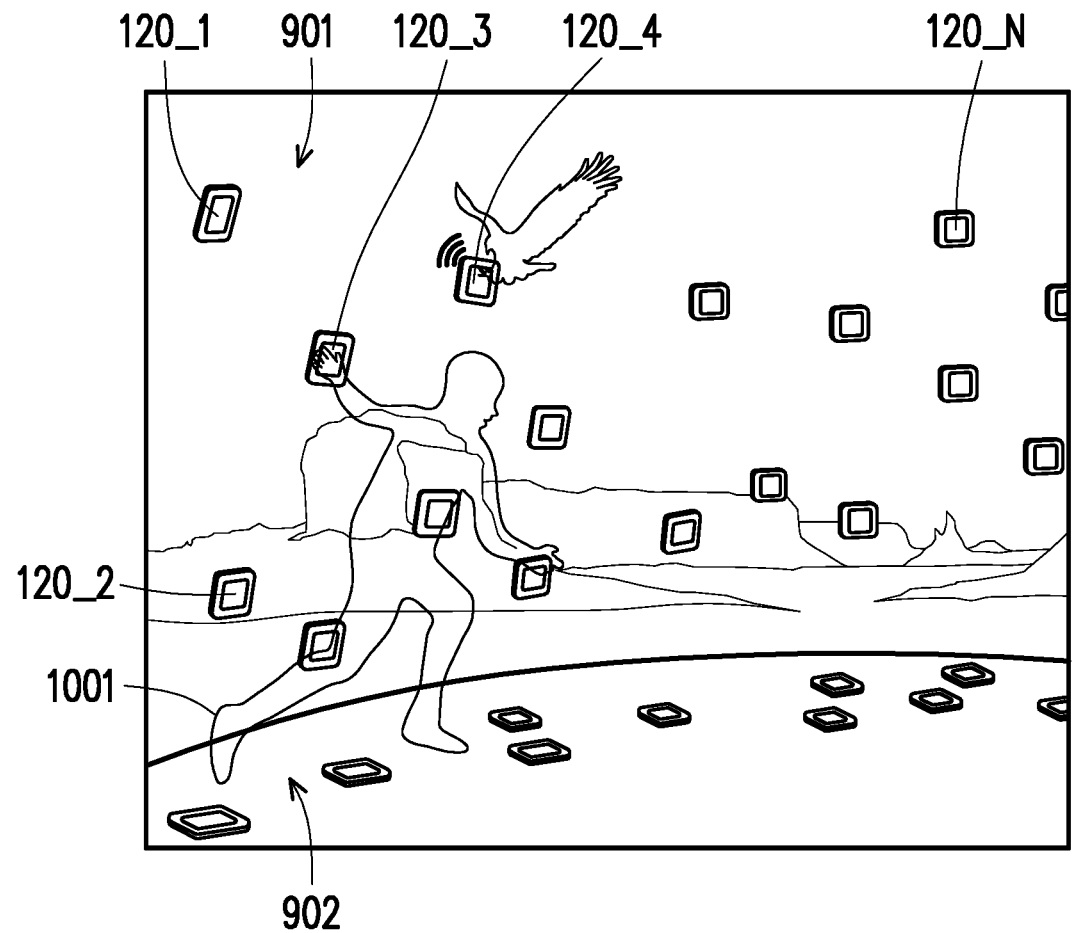
FIG. 10A is a schematic view of an immersive interactive context according to the second embodiment of the disclosure.
Figure 10B:
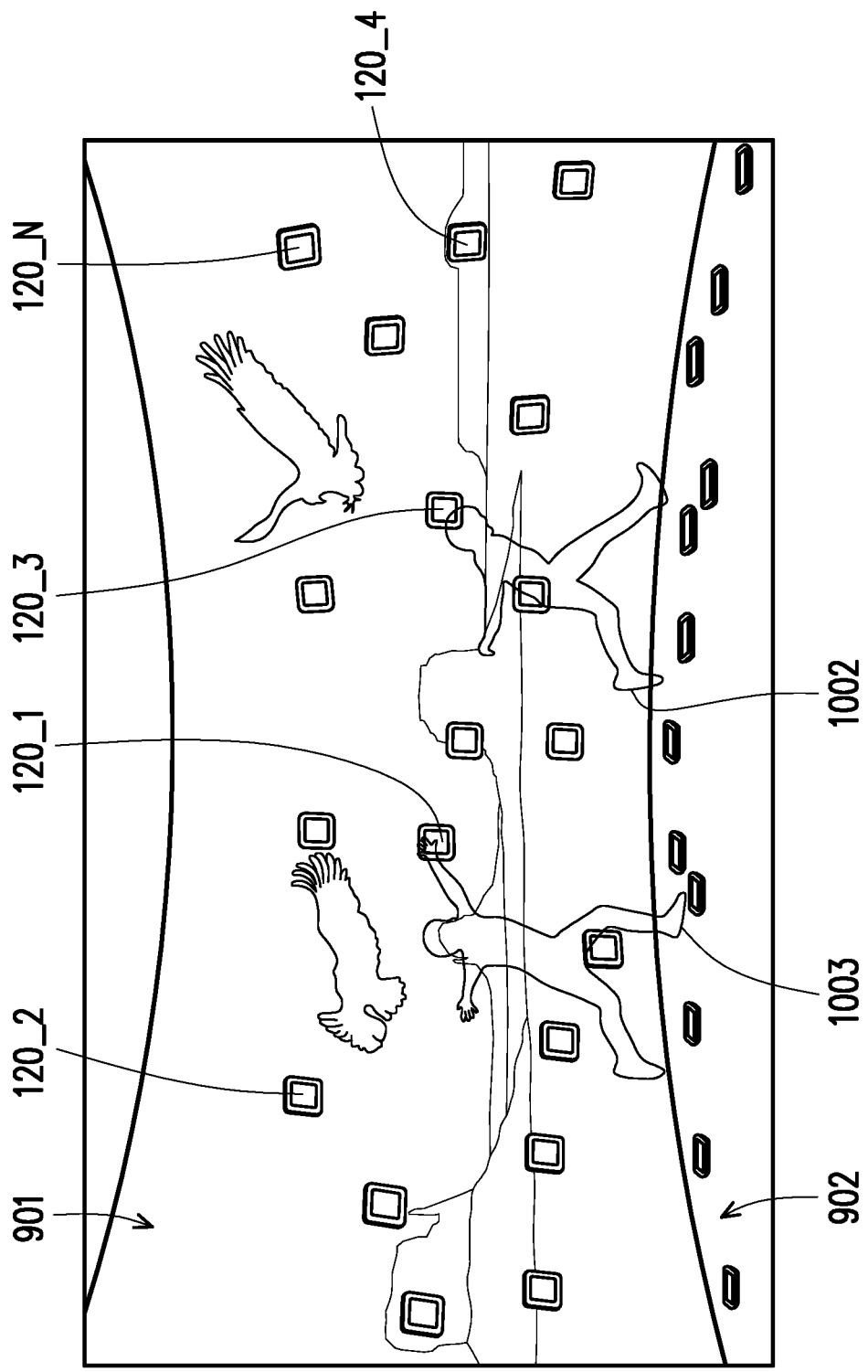
FIG. 10B is a schematic view of another immersive interactive context according to the second embodiment of the disclosure.

FIG. 9 is a flowchart illustrating an immersive interactive method according to the second embodiment of the disclosure. FIG. 10A is a schematic view of an immersive interactive context according to the second embodiment of the disclosure. FIG. 10B is a schematic view of another immersive interactive context according to the second embodiment of the disclosure. Referring to FIG. 1, FIG. 9, and FIG. 10A, in step S910, the immersive multimedia system 100 performs the second interactive mode. In the second interactive mode, the imaging apparatus 140 displays an image screen on at least one of the wall 901 and the ground 902, such as a Grand Canyon background image displayed on the wall 901 and the ground 902 in FIG. 10A. In step S920, when the touch sensing unit of at least one (e.g., the movable interactive unit 120_3) of the plurality of the movable interactive units 120_1-120_N on the wall 901 and the ground 902 senses being touched by the touch object (e.g., the hand of the user 1001), the computer device 110 controls the movable interactive unit 120_3 touched to move to follow the touch object. In step S930, the computer device 110 emits various color lights through the light-emitting unit of the movable interactive unit 120_3 touched and the light-emitting unit of at least one of part of the plurality of the movable interactive units untouched. In step S940, the computer device 110 controls at least one of part of the plurality of the movable interactive units untouched to move toward the movable interactive unit 120_3 touched. In step S950, the computer device 110 determines whether at least one of part of the plurality of the movable interactive units untouched touches the movable interactive unit 120_3 touched. If not, the computer device 110 continues to perform step S940. If yes, in step S960, the computer device 110 stops moving the movable interactive unit 120_3 touched.

For example, the imaging apparatus 140 may display a specific pattern, such as a bird icon, on the movable interactive unit 120_4. Moreover, when the user 1001 touches the movable interactive unit 120_3, the movable interactive unit 120_4 moves toward the movable interactive unit 120_3, and the bird icon follows the movable interactive unit 120_4 to move. In this regard, the user may try to prevent the movable interactive unit 120_3 from being touched by the movable interactive unit 120_4. In this way, the hand of the user 1001 is in front of the movable interactive unit 120_3, so that the infrared sensor of the movable interactive unit 120_3 senses the displacement of the hand of the user 1001, and thereby the computer device 110 controls the movable interactive unit 120_3 to perform corresponding displacement.

Referring to FIG. 1 and FIG. 10B, the second interactive mode also provides an effect of multiplayer interactive games. As shown in FIG. 10B, according to steps S910 to S960 in FIG. 9, the computer device 110 controls at least one of the movable interactive units 120_2-120_4 to emit audio signals and color lights. The arrangement of the reference numerals of the movable interactive units is for illustration only. Users 1002 and 1003 may have a competition. For example, after the users 1002 and 1003 respectively touch the movable interactive units 120_1 and 120_3, an eagle pattern or other movable interactive units displayed on the wall 901 by the imaging apparatus 140 move toward the movable interactive units 120_1 and 120_3; and the users 1002 and 1003 may compete for not being touched by the eagle pattern or other movable interactive units. Therefore, the second interactive mode in the embodiment is capable of providing one or more people with interactive training or games and thereby offering a good user immersive interactive experience.

Figure 10E:
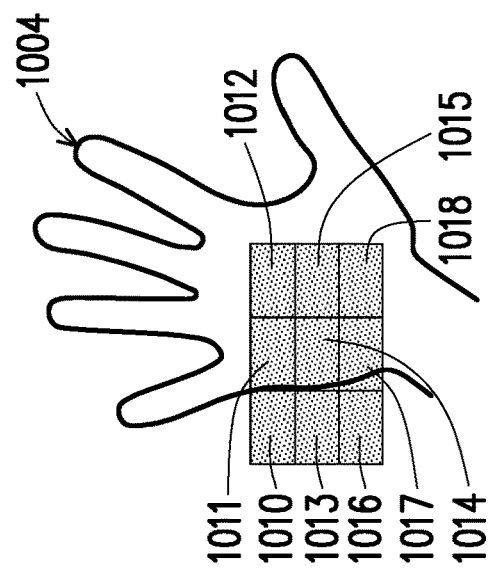
FIG. 10C to FIG. 10E are schematic views illustrating the detection of a touch object according to the second embodiment of the disclosure.
Figure 10D:
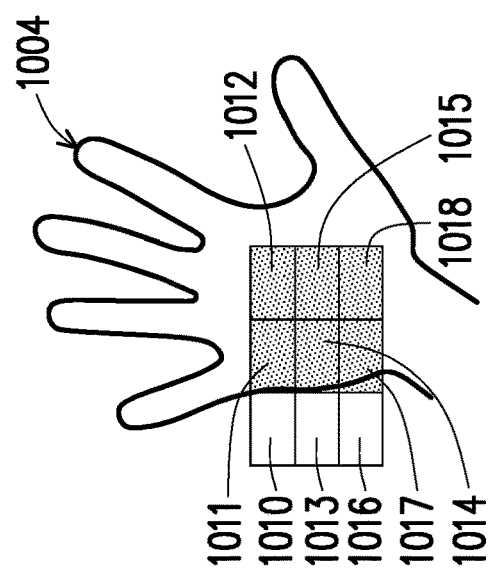
Figure 10C:
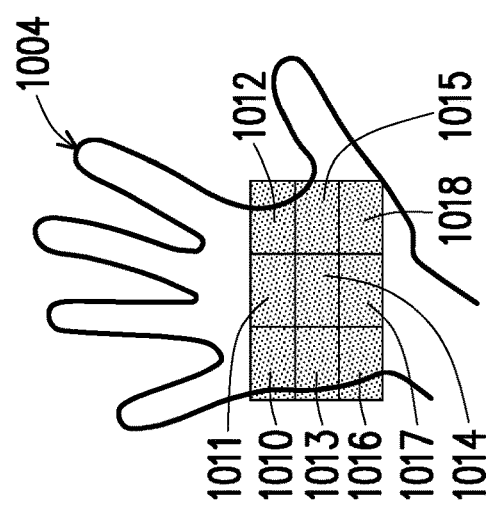

FIG. 10C to FIG. 10E are schematic views illustrating the detection of a touch object according to the second embodiment of the disclosure. Referring to FIG. 10A and FIG. 10C to FIG. 10E, in the embodiment, the camera unit (e.g., the camera unit 450 in FIG. 4) of the movable interactive unit 120_3 is disposed on the casing of the movable interactive unit 120_3. Moreover, in the second interactive mode, the camera unit of the movable interactive unit 120_3 touched is adapted to photograph a touch object 1004 (e.g., the hand of a user); the movable interactive unit 120_3 touched determines the moving direction of the touch object 1004 according to a plurality of brightness value changes of a plurality of regions 1010-1018 in the camera image obtained by the camera unit; and the movable interactive unit 120_3 touched moves accordingly according to the moving direction.

As shown in FIG. 10C, the camera unit of the movable interactive unit 120_3 photographs the image of the plurality of the regions 1010-1018 of the touch object 1004. The regions 1010-1018 in the image have the same or similar brightness values. At the next timing, when the touch object 1004 moves, as shown in FIG. 10D, the camera unit of the movable interactive unit 120_3 photographs the image of the plurality of the regions 1010-1018 of the touch object 1004, and the regions 1010, 1013, and 1016 in the image are changed to have brightness values that are different from or greater than those of the regions 1011, 1012, 1014, 1015, 1017, and 1018. In this regard, the computer device 110 determines, for example, that the touch object 1004 moves to the left, so the touch object 1004 controls the movable interactive unit 120_3 to also move to the left. Therefore, at another next timing, when the movable interactive unit 120_3 moves corresponding to the touch object 1004, as shown in FIG. 10E, the camera unit of the movable interactive unit 120_3 photographs the image of the plurality of the regions 1010-1018 of the touch object 1004. The regions 1010-1018 in the image are restored to have the same or similar brightness values.

Figure 11:
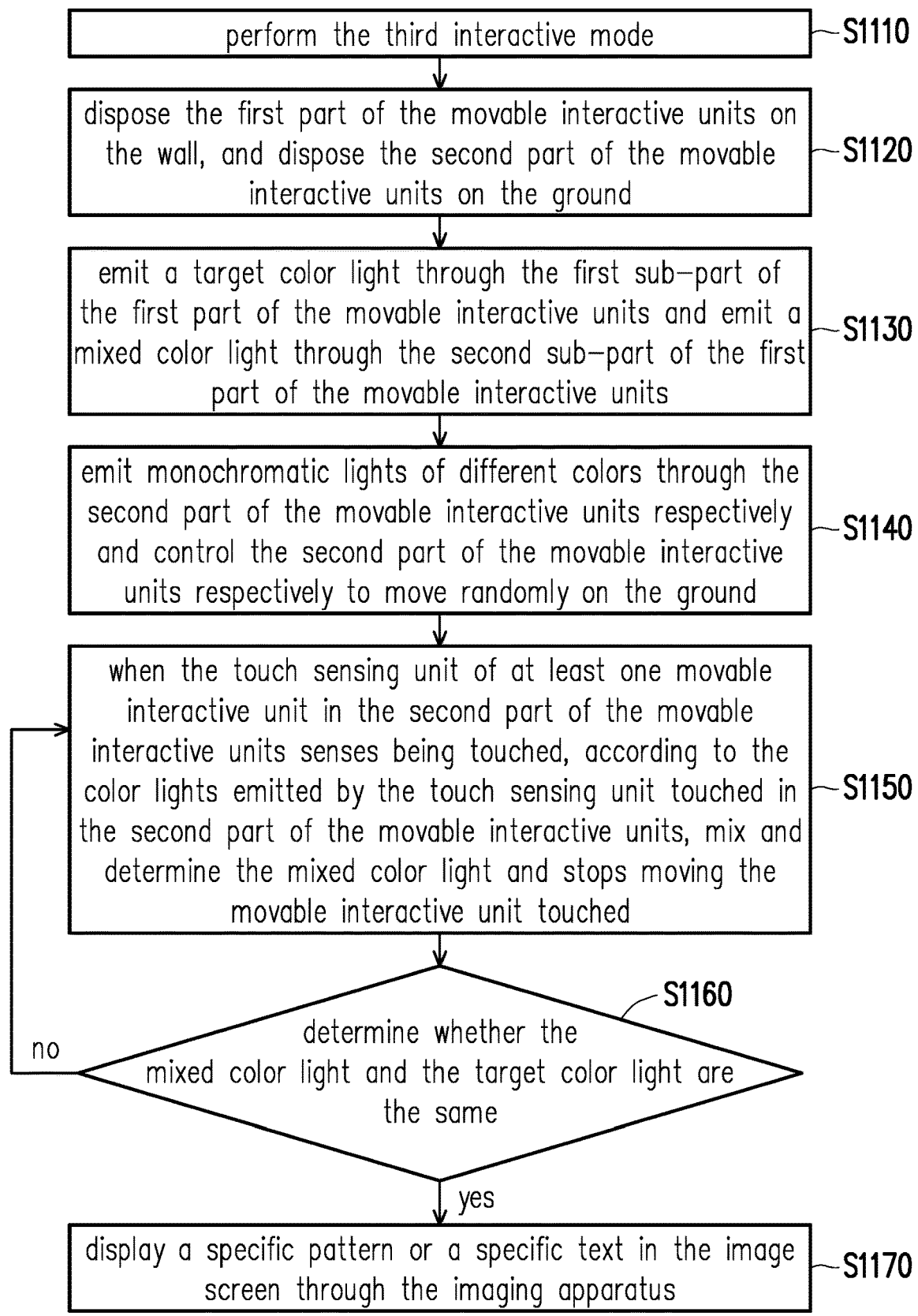
FIG. 11 is a flowchart illustrating an immersive interactive method according to the third embodiment of the disclosure.
Figure 12A:
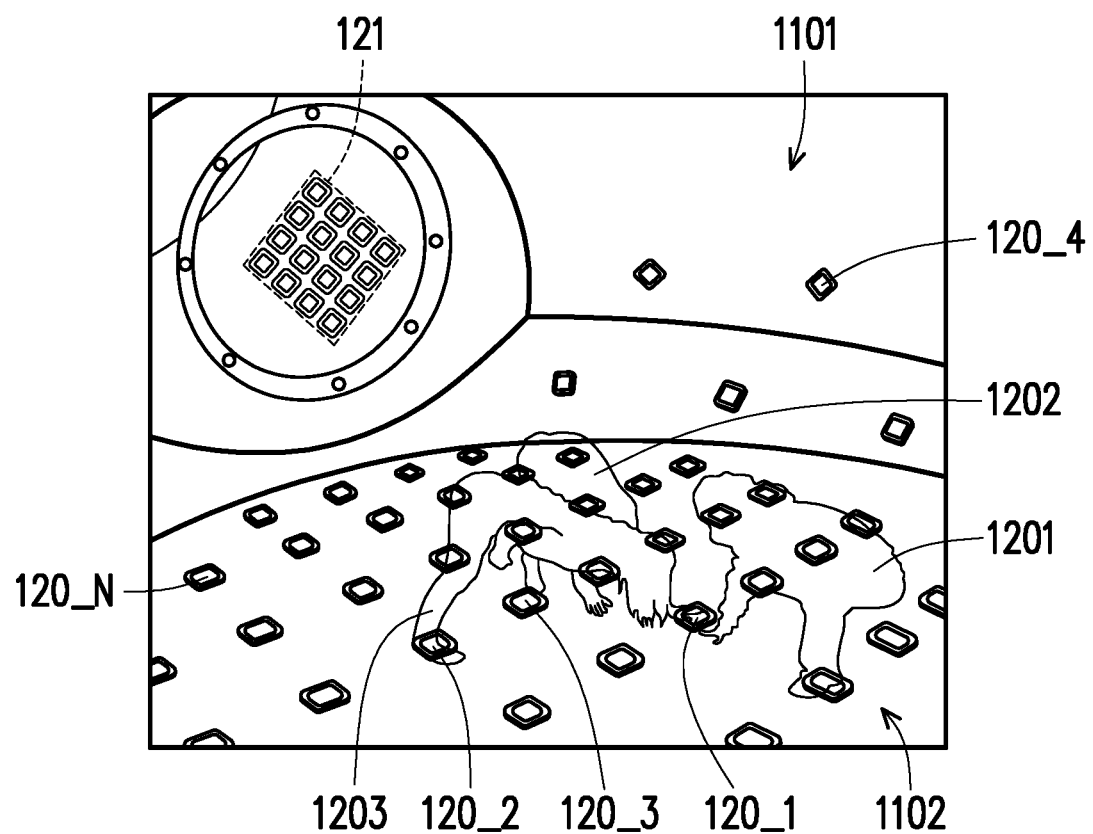
FIG. 12A is a schematic view of an immersive interactive context according to the third embodiment of the disclosure.
Figure 12B:
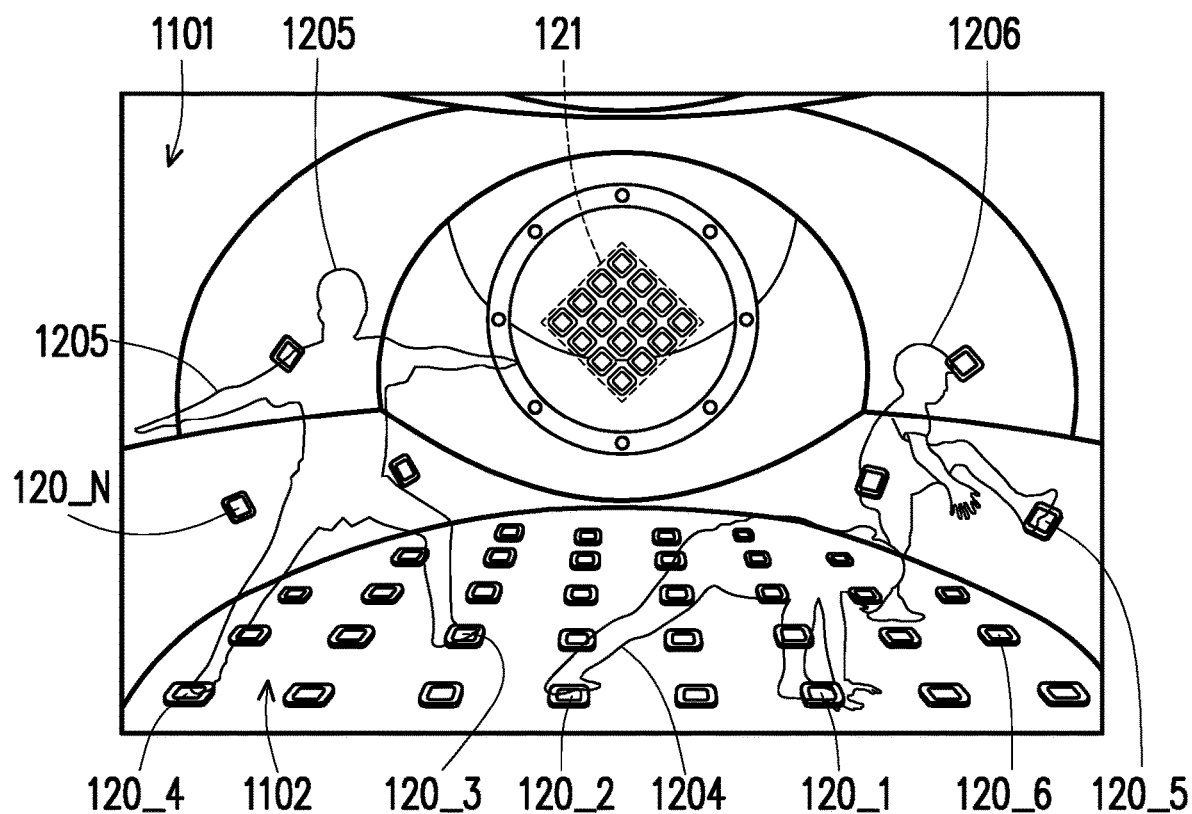
FIG. 12B is a schematic view of another immersive interactive context according to the third embodiment of the disclosure.

FIG. 11 is a flowchart illustrating an immersive interactive method according to the third embodiment of the disclosure. FIG. 12A is a schematic view of an immersive interactive context according to the third embodiment of the disclosure. FIG. 12B is a schematic view of another immersive interactive context according to the third embodiment of the disclosure. Referring to FIG. 1, FIG. 11, and FIG. 12A, in step S1110, the immersive multimedia system 100 performs the third interactive mode. In the third interactive mode, the imaging apparatus 140 displays an image screen on at least one of the wall 1101 and the ground 1102, such as a specific game background image displayed on the wall 1101 and the ground 1102 in FIG. 11A. In step S1120, the computer device 110 controls the movable interactive units 120_1-120_N to move, the first part of the movable interactive units 120_1-120_N are disposed on the wall 1101, and the second part of the movable interactive units 120_1-120_N are disposed on the ground 1102.

In step S1130, a target color light is emitted through the first sub-part of the first part of the movable interactive units and a mixed color light is emitted through the second sub-part of the first part of the movable interactive units. In step S1140, the computer device 110 controls the second part of the movable interactive units 120_1-120_N respectively to emit monochromatic lights of different colors and controls the second part of the movable interactive units 120_1-120_N respectively to move randomly on the ground 1102. In step S1150, when the touch sensing unit of at least one movable interactive unit in the second part of the movable interactive units 120_1-120_N senses being touched, according to the color lights emitted by the touch sensing unit touched in the second part of the movable interactive units 120_1-120_N, the computer device 110 mixes and determines the mixed color lights and stops moving the movable interactive unit touched.

For example, the first part of the movable interactive units 120_1-120_N are arranged to form a specific array 121 and remain stationary, and the imaging apparatus 140 displays a target color around the specific array 121. When the users 1201, 1202, and 1203 have a game together and touch the movable interactive units 120_1-120_3 in the second part of the movable interactive units 120_1-120_N, the computer device 110 performs color mixing according to the first color light, the second color light, and the third color light respectively emitted by the movable interactive units 120_1-120_3, so that the first part of the movable interactive units 120_1-120_N in the specific array 121 emit mixed color lights. In other words, the user 1201, 1202, and 1203 determine whether the color mixing result displayed by the movable interactive unit in the specific array 121 is the same as the target color displayed around the specific array 121 to determine whether to touch other movable interactive units so that the color mixing result displayed by the movable interactive units in the specific array 121 is the same as the target color displayed around the specific array 121. Therefore, in step S1160, the computer device 110 determines whether the mixed color light and the target color light are the same. If not, the computer device 110 re-performs step S1150. If yes, the computer device 110 performs step S1170. In step S1170, the computer device 110 displays a specific pattern or a specific text in the image screen through the imaging apparatus 140.

Referring to FIG. 1 and FIG. 12B, the third interactive mode provides an effect of multiplayer interactive games. As shown in FIG. 12B, according to steps S1110-S1170 in FIG. 11, the computer device 110 controls the movable interactive units 120_1-120_N to move, the first part of the movable interactive units 120_1-120_N are disposed on the wall 1101, and the second part of the plurality of the movable interactive units 120_1-120_N are disposed on the ground 1102. For example, for example, the computer device 110 further groups the second part of the movable interactive units 120_1-120_N on the ground 1102 into three groups for users 1204 to 1206 to have a competition. In this regard, the movable interactive units 120_1-120_N on the wall 1101 are also grouped corresponding to the results of the respective touches of the users 1204-1206. Therefore, the third interactive mode in the embodiment is capable of providing one or more people with interactive or competing training or games and thereby offering a good user immersive interactive experience.

Figure 13A:
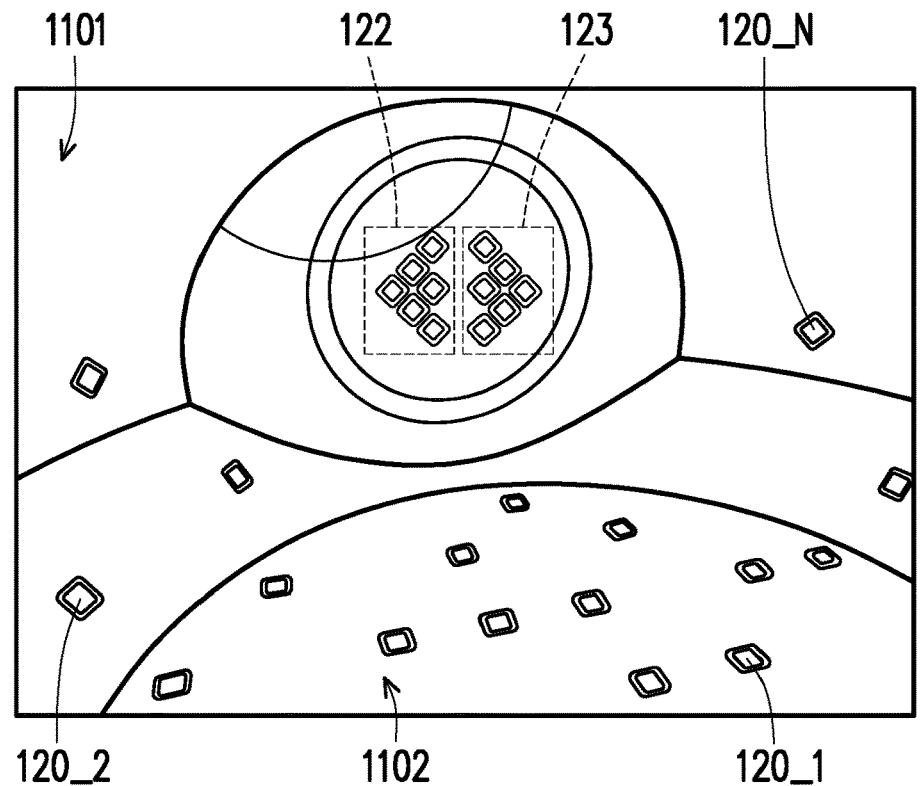
FIG. 13A and FIG. 13B are schematic views of an image screen in an immersive interactive context according to the third embodiment of the disclosure.
Figure 13B:
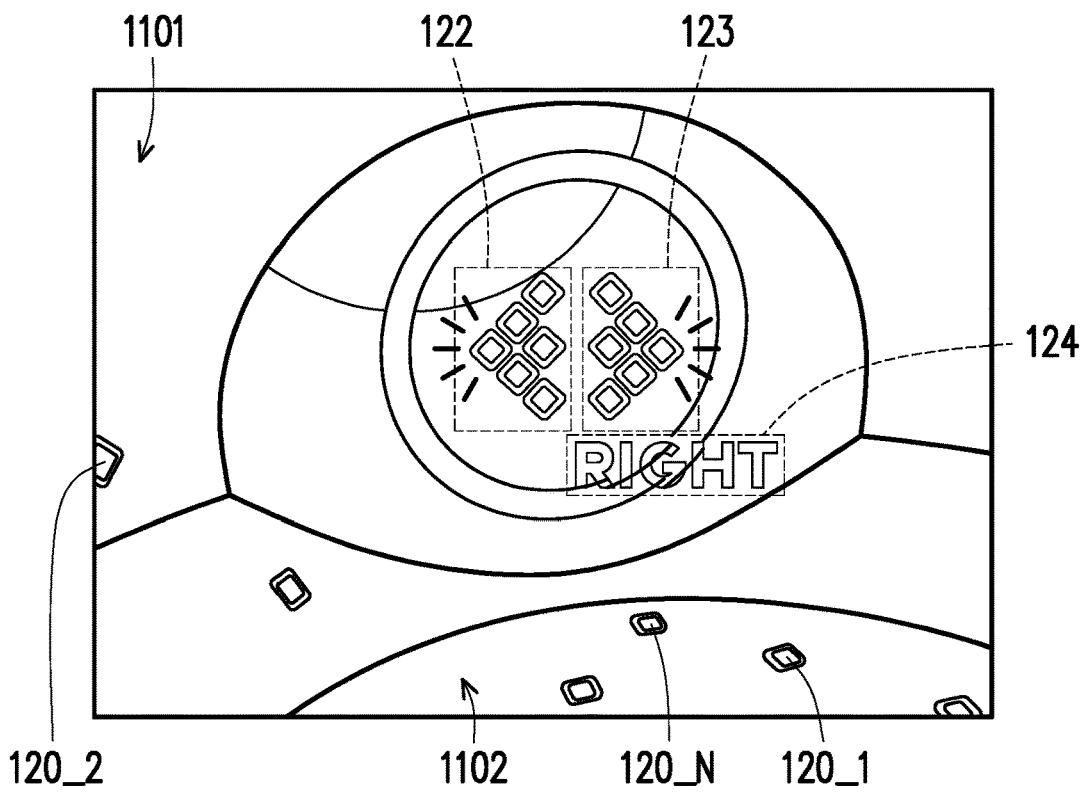

FIG. 13A and FIG. 13B are schematic views of an image screen in an immersive interactive context according to the third embodiment of the disclosure. Referring to FIG. 1 and FIG. 13A, another mode of the immersive interactive context of the third embodiment in the disclosure is as shown in FIG. 13A. In FIG. 13A, the first part of the movable interactive units 120_1-120_N disposed on the wall 1101 are further grouped into a first array 122 and a second array 123. The first array 122 is adapted to emit a target color light, and the second array 123 is adapted to emit a mixed color light. Moreover, when the target color light emitted by the first array 122 is the same as the mixed color light emitted by the second array 123, as shown in FIG. 13B, the imaging apparatus 140 displays a specific pattern 124 or a specific text in the image screen on the wall 1101 to prompt the success of the color mixing operation or other training information.

Based on the above, the immersive multimedia system, the immersive interactive method, and the movable interactive unit in the disclosure are capable of providing users with an immersive interactive experience in games, training, or competitions in a closed or semi-enclosed space without wearing any equipment or sensors. Moreover, the immersive multimedia system, immersive interactive method, and the movable interactive unit in the disclosure also allow one or more users to participate in the immersive interactive experience at the same time, thereby providing multiple interactive experiences.

Although the disclosure has been described with reference to the above embodiments, it will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. An immersive multimedia system adapted to provide an immersive multimedia context in a space comprising a wall and a ground, wherein the immersive multimedia system comprises:
 a plurality of movable interactive units disposed on at least one of the wall and the ground;
 an imaging apparatus adapted to display an image screen on at least one of the wall and the ground; and
 a computer device connected to the plurality of the movable interactive units and the imaging apparatus, and adapted to control the plurality of the movable interactive units for changing the movement state of the movable interactive units in response to at least one of the movable interactive units sensing being touched, and determining the content of the image screen displayed by the imaging apparatus according to an interactive mode,
 wherein the plurality of the movable interactive units each comprise a touch sensing unit, and the image screen provided by the imaging apparatus is changed in response to the touch sensing unit of at least one of the plurality of the movable interactive units sensing being touched,
 wherein a track mechanism is disposed on at least one of the wall and the ground, and the track mechanism comprises:
  a track; and
  a plurality of carriers connected to the computer device, wherein the plurality of the carriers each comprise a carrier axle and an electromagnet, wherein the plurality of the carriers are embedded in the track through each own carrier axle, and the plurality of the carriers are combined with corresponding movable interactive units through each own electromagnet, so that the plurality of the carriers move along the track with the plurality of the movable interactive units.

2. The immersive multimedia system according to claim 1, wherein the plurality of the movable interactive units each further comprise:
- a casing comprising a light transmitting plate, wherein the touch sensing unit is disposed in the casing;
- a magnet disposed in the casing and adapted to be combined with the electromagnet of the corresponding carrier; and
- a light-emitting unit disposed in the casing, wherein the touch sensing unit and the light-emitting unit are disposed under the light transmitting plate.

3. The immersive multimedia system according to claim 2, wherein in a first interactive mode, the plurality of the movable interactive units respectively move randomly on at least one of the wall and the ground; and when the touch sensing unit of the at least one of the plurality of the movable interactive units senses being touched, the imaging apparatus displays a first specific pattern at a position on the wall and the ground corresponding to the movable interactive unit touched, and the movable interactive unit touched stops moving.

4. The immersive multimedia system according to claim 3, wherein the plurality of the movable interactive units each further comprise:
- a speaker disposed in the casing,
- wherein in the first interactive mode, speakers of the plurality of the movable interactive units respectively emit audio signals.

5. The immersive multimedia system according to claim 3, wherein in the first interactive mode, light-emitting units of the plurality of the movable interactive units respectively emit color lights.

6. The immersive multimedia system according to claim 2, wherein in a second interactive mode, when the touch sensing unit of the at least one of the plurality of the movable interactive units senses being touched by a touch object, the movable interactive unit touched follows the touch object to move, and at least one of part of the plurality of the movable interactive units untouched moves toward the movable interactive unit touched, wherein the imaging apparatus displays a second specific pattern at a position corresponding to the at least one of the part of the plurality of the movable interactive units untouched.

7. The immersive multimedia system according to claim 6, wherein in the second interactive mode, when the at least one of the part of the plurality of the movable interactive units untouched touches the movable interactive unit touched, the movable interactive unit touched stops moving.

8. The immersive multimedia system according to claim 6, wherein in the second interactive mode, a light-emitting unit of the movable interactive unit touched and light-emitting units of the at least one of the part of the plurality of the movable interactive units untouched emit different color lights.

9. The immersive multimedia system according to claim 6, wherein in the second interactive mode, the movable interactive unit touched and the at least one of the part of the plurality of the movable interactive units untouched are disposed on the wall; another part of the plurality of the movable interactive units are disposed on the ground; and when at least one of the another part of the plurality of the movable interactive units is touched, light-emitting units of the another part of the plurality of the movable interactive units touched emit specific color lights.

10. The immersive multimedia system according to claim 6, wherein the plurality of the movable interactive units each further comprise:
- a camera unit disposed on the casing,
- wherein in the second interactive mode, the camera unit of the movable interactive unit touched is adapted to photograph the touch object; the movable interactive unit touched determines a moving direction of the touch object according to a plurality of brightness value changes of a plurality of regions in a camera image; and the movable interactive unit touched moves accordingly according to the moving direction.

11. The immersive multimedia system according to claim 2, wherein in a third interactive mode, a first part of the plurality of the movable interactive units are disposed on the wall; and a second part of the plurality of the movable interactive units are disposed on the ground, wherein a first sub-part of the first part of the plurality of the movable interactive units are adapted to emit a target color light, and a second sub-part of the first part of the plurality of the movable interactive units emit a mixed color light,
wherein the second part of the plurality of the movable interactive units respectively emit monochromatic lights of different colors, and when the touch sensing unit of at least one movable interactive unit of the second part of the plurality of the movable interactive units senses being touched, the mixed color light is mixed and generated by color lights emitted by the touch sensing unit touched of the second part of the plurality of the movable interactive units.

12. The immersive multimedia system according to claim 11, wherein in the third interactive mode, the second part of the plurality of the movable interactive units respectively move randomly on the ground.

13. The immersive multimedia system according to claim 11, wherein in the third interactive mode, when the mixed color light is the same as the target color light, the imaging apparatus displays a specific pattern or a specific text in the image screen.

14. The immersive multimedia system according to claim 1, wherein the plurality of the movable interactive units each further comprise an infrared sensor, and the computer device determines height information and position information of an interactive object in the space according to a plurality of infrared sensing information provided by the plurality of the movable interactive units, wherein the computer device determines a distribution situation of the plurality of the movable interactive units on at least one of the wall and the ground according to the height information and the position information.

15. The immersive multimedia system according to claim 1, wherein the imaging apparatus is a projector adapted to project the image screen on at least one of the wall and the ground.

16. The immersive multimedia system according to claim 1, wherein the imaging apparatus is a display panel disposed along at least one of the wall and the ground.

17. An immersive interactive method for an immersive multimedia system, wherein the immersive multimedia system is adapted to provide immersive multimedia information in a space, and the space comprises a wall and a ground, wherein the immersive multimedia system comprises a plurality of movable interactive units, an imaging apparatus, and a computer device, and the plurality of the movable interactive units are disposed on at least one of the wall and the ground, wherein the immersive interactive method comprises:
displaying an image screen on at least one of the wall and the ground through the imaging apparatus, wherein the content of the image screen is determined by the computer device according to an interactive mode;

controlling the movement states of the movable interactive units according to the interactive mode by the computer device; and changing the image screen provided by the imaging apparatus and changing the movement states of the movable interactive units by the computer device in response to a touch sensing unit of at least one of the plurality of the movable interactive units sensing being touched, wherein a track mechanism is disposed on at least one of the wall and the ground, and the track mechanism comprises:

a track; and a plurality of carriers connected to the computer device, wherein the plurality of the carriers each comprise a carrier axle and an electromagnet, wherein the plurality of the carriers are embedded in the track through each own carrier axle, and the plurality of the carriers are combined with corresponding movable interactive units through each own electromagnet, so that the plurality of the carriers move along the track with the plurality of the movable interactive units.

18. The immersive interactive method according to claim 17, further comprising:

controlling the plurality of the movable interactive units respectively to move randomly on at least one of the wall and the ground in a first interactive mode, wherein the step of changing the image screen provided by the imaging apparatus in response to the touch sensing unit of the at least one of the plurality of the movable interactive units sensing being touched comprises:

when the touch sensing unit of the at least one of the plurality of the movable interactive units senses being touched, displaying a first specific pattern at a position on the wall and the ground corresponding to the movable interactive unit touched through the imaging apparatus, and stopping moving the movable interactive unit touched.

19. The immersive interactive method according to claim 17, further comprising:

when the touch sensing unit of the at least one of the plurality of the movable interactive units senses being touched by a touch object, in a second interactive mode, controlling the movable interactive unit touched to move to follow the touch object, and controlling at least one of part of the plurality of the movable interactive units untouched to move toward the movable interactive unit touched wherein the step of changing the image screen provided by the imaging apparatus in response to the touch sensing unit of the at least one of the plurality of the movable interactive units sensing being touched comprises:

displaying a second specific pattern at a position corresponding to at least one of part of the plurality of the movable interactive units untouched through the imaging apparatus.

20. The immersive interactive method according to claim 19, further comprising:

when the at least one of the part of the plurality of the movable interactive units untouched touches the movable interactive unit touched in the second interactive mode, stopping moving the movable interactive unit touched.

21. The immersive interactive method according to claim 19, further comprising:

enabling a light-emitting unit of the movable interactive unit touched and light-emitting units of the at least one of the part of the plurality of the movable interactive units untouched to emit different color lights in the second interactive mode.

22. The immersive interactive method according to claim 19, further comprising:

disposing the movable interactive unit touched and the at least one of the part of the plurality of the movable interactive units untouched on the wall, and disposing another part of the plurality of the movable interactive units on the ground in the second interactive mode; and when at least one of the another part of the plurality of the movable interactive units is touched, enabling light-emitting units of the another part of the plurality of the movable interactive units touched to emit a specific color light.

23. The immersive interactive method according to claim 19, further comprising:

photographing the touch object through a camera unit of the movable interactive unit touched in the second interactive mode;

determining a moving direction of the touch object according to a plurality of brightness value changes of a plurality of regions in a camera image; and accordingly moving the movable interactive unit touched according to the moving direction.

24. The immersive interactive method according to claim 17, further comprising:

disposing a first part of the plurality of the movable interactive units on the wall, and disposing a second part of the plurality of the movable interactive units on the ground in a third interactive mode;

emitting a target color light through a first sub-part of the first part of the plurality of the movable interactive units, and emitting a mixed color light through a second sub-part of the first part of the plurality of the movable interactive units;

emitting monochromatic lights of different colors through the second part of the plurality of the movable interactive units respectively; and when the touch sensing unit of at least one movable interactive unit of the second part of the plurality of the movable interactive units senses being touched, mixing and generating the mixed color light according to a color light emitted by the touch sensing unit touched of the second part of the plurality of the movable interactive units.

25. The immersive interactive method according to claim 24, further comprising:

controlling the second part of the plurality of the movable interactive units respectively to move randomly on the ground in the third interactive mode.

26. The immersive interactive method according to claim 24, wherein the step of changing the image screen provided by the imaging apparatus in response to the touch sensing unit of at least one of the plurality of the movable interactive units sensing being touched comprises:

displaying a specific pattern or a specific text in the image screen through the imaging apparatus when the mixed color light is the same as the target color light in the third interactive mode.

27. The immersive interactive method according to claim 17, further comprising:
- sensing an interactive object through a plurality of infrared sensors of the plurality of the movable interactive units;
- determining height information and position information of the interactive object in the space according to a plurality of infrared sensing information provided by the plurality of the movable interactive units; and
- determining a distribution situation of the plurality of the movable interactive units on at least one of the wall and the ground according to the height information and the position information.

* * * * *